Dec. 5, 1944.   H. KAPOLKIN   2,364,535
MARINE WAVES POWER PLANT
Filed Feb. 17, 1944   2 Sheets-Sheet 1
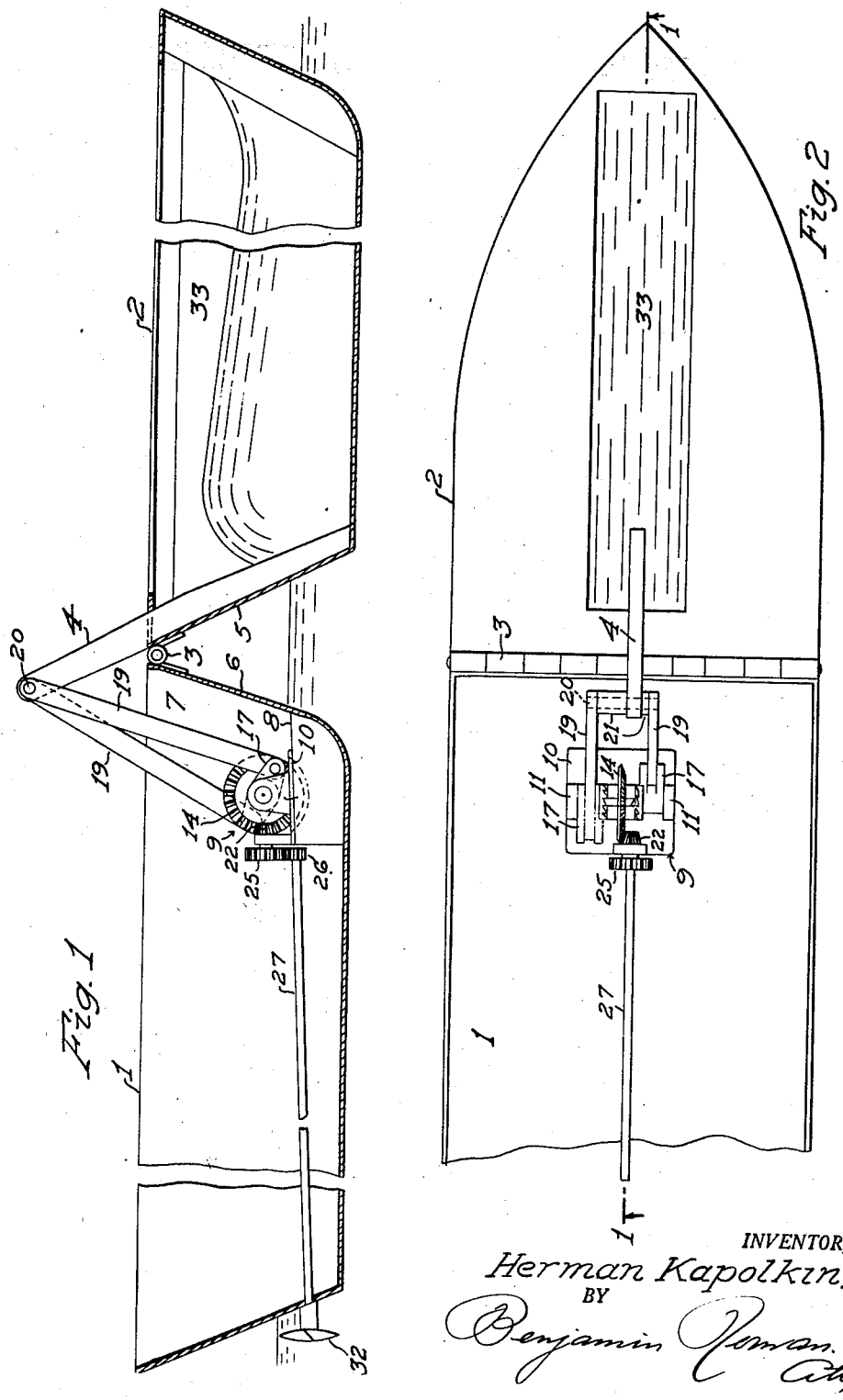
INVENTOR,
Herman Kapolkin,
BY
Benjamin Numan.
Atty.

Dec. 5, 1944.  H. KAPOLKIN  2,364,535
MARINE WAVES POWER PLANT
Filed Feb. 17, 1944  2 Sheets-Sheet 2
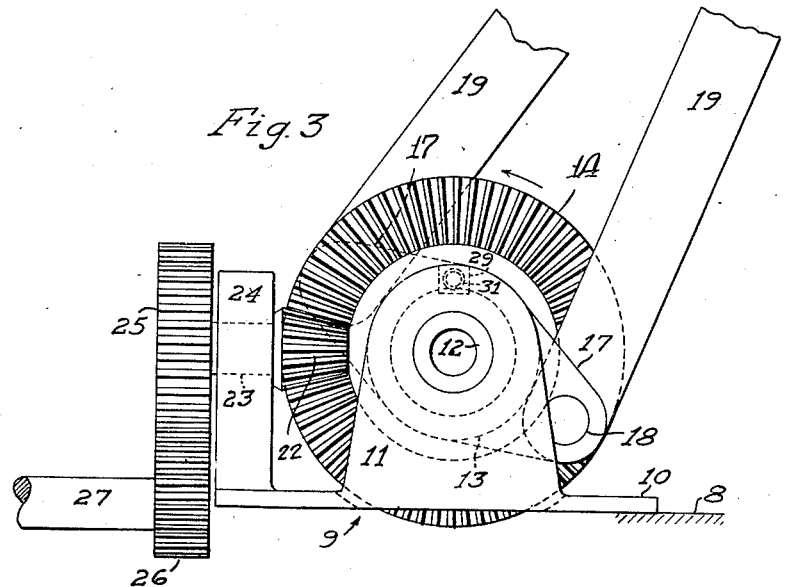
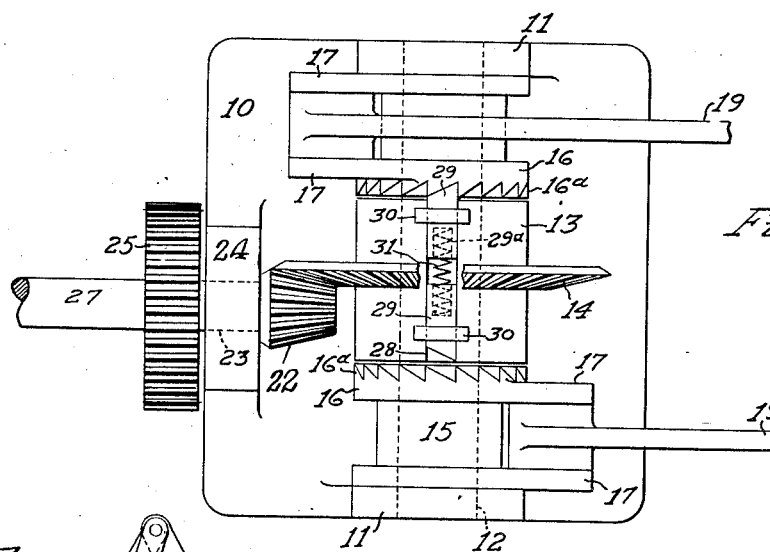
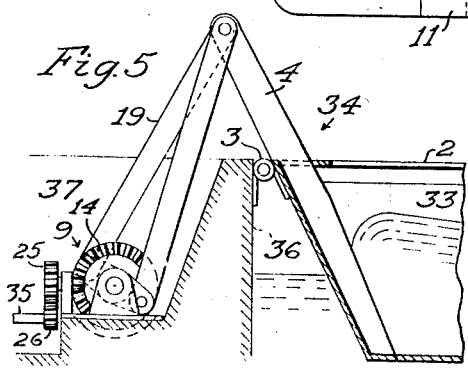
INVENTOR,
Herman Kapolkin,
BY Patented Dec. 5, 1944

2,364,535

UNITED STATES PATENT OFFICE 2,364,535

MARINE WAVES POWER PLANT

Herman Kapolkin, New York, N. Y.

Application February 17, 1944, Serial No. 522,748

11 Claims. (Cl. 115—4)

This invention relates to a power plant deriving its energy from the action of marine waves. Many machines and devices have been heretofore proposed for converting the energy inherent in marine waves into useful power; and the principal object of my invention is to provide a simplified, conveniently and economically erectable, conveniently and economically operable, practical, efficient, and improved power plant wherewith the energy of marine waves may be utilized for propelling ships, or creating power for any other practical purposes.

Other objects and advantages will hereinafter appear.

In the accompanying drawings:

Fig. 1 is a longitudinal cross-sectional elevation, taken on line 1—1, Fig. 2, illustrating the marine waves power plant constituting the invention, and the mode of its application in connection with the propulsion of ships.

Fig. 2 is a plan view of the marine vessel and power plant therefor, shown in Fig. 1.

Fig. 3 is an elevational view of mechanism utilized in connection with the invention.

Fig. 4 is a plan view of the mechanism shown in Fig. 3.

Fig. 5 is a longitudinal cross-sectional elevational view illustrating a modification of the invention.

In its applicability to the propulsion of ships, the invention includes a pair of marine vessels 1, 2, joined to each other, stern to bow, by means of a hinge 3, as illustrated in Figs. 1, 2, whereby each of the vessels is capable of heaving by the action of the marine waves, upwardly and downwardly, independently of and relatively to each other, about said hinge. The vessel 2 is provided at its stern with a mast 4, which is inclined as shown and overhangs from its stern 5 directly over and above the bow 6 and hull 7 of the vessel 1. Upon a platform 8 within the vessel 1 is erected mechanism 9, shown fully in Figs. 3, 4, comprising a base 10, Figs. 3, 4, having posts 11 connected by a fixed shaft 12 on which is rotatably mounted a drum 13 carrying a bevel gear 14. At each end of the drum 13 is located a sleeve 15, rotatably mounted on the shaft 12 and carrying a ratchet 16, facing said drum, and a pair of cranks 17 to which is pivoted at 18 a link 19, both links extending upwardly from the mechanism 9, Fig. 1, and being conjointly pivoted to the extremity of the mast 4, by means of a pin 20 and spacers 21, Fig. 2. The gear 14 meshes with a bevel gear 22 fixed on a shaft 23 journaled in a post 24, which shaft carries a gear 25 that meshes with a smaller gear 26 keyed upon a driveshaft 27.

In a notch 28 formed in the drum 13 are located pawls 29, Fig. 4, for the ratchets 16. Each pawl 29 is held in place by a strap 30 and is slidable longitudinally in the notch 28, toward and away from the ratchet-teeth 16a, being normally impelled toward said teeth by a spring 31, located between both pawls and extending into bores 29a thereof.

As herein shown, the drive shaft 27 constitutes the power shaft, Fig. 1, for the propeller 32 of the vessel 1. As the vessels 1, 2 are heaved by the action of the waves, about their joining hinge 3, the mast 4 sways accordingly and thereby pushes the links 19 toward the mechanism 9 and correspondingly draws them away therefrom, which reciprocates the cranks 17 to impart partial rotations to the ratchets 16 in opposite directions. When the ratchets 16 rotate partially clockwise, as viewed in the drawings, they do not affect the drum 13, and the teeth 16a merely slide away the pawls 29 contrary to the pressure of spring 31, but when the ratchets 16 rotate backwardly the teeth 16a engage the pawls 29 and thereby impart partial rotations to the drum 13 and bevel gear 14 in the same direction, which aggregate rotations produce continuous rotation of the gear 14 in the direction of the arrow. This rotation of the gear 14 is thereupon transmitted to a higher rotation of the power shaft 27 by the intervening gears 22, 25, 26.

The hull of the vessel 2, Figs. 1, 2, is provided with a large tank 33 containing water, which becoming agitated by the heaving of the vessel produces waves thereof, as shown, that operate to increase the heaving of the vessel and the swaying action of the mast 4, to add speed to the operation of the mechanism 9, with speed and power to the propeller shaft 27. The action of the water waves in tank 33 also prolongs the heaving of the vessel 2 between its heaves produced by the marine waves, thereby resulting in greater continuity of operation of the mechanism 9 and drive shaft 27, with higher efficiency of the propulsion.

In the modification shown in Fig. 5, the invention is shown as applied to purposes other than propelling ships, as for converting the energy of marine waves, through a power plant 34, for driving a shaft 35 situated on land, which shaft may in turn be used for driving dynamos or transmitting other kinds of power. In this power plant, at vessel 2 is secured by a hinge 3 to a bulwark 36, beyond which is a crypt 37 having erected at its bottom the operating mechanism 9, the links 19 of which extend therefrom to the extremity of the mast 4 that overhangs from the vessel 2 over and above the crypt 37. As the vessel 2 is heaved by the marine waves, about the hinge 3, the mast 4 is swayed correspondingly and through the mechanism 9 operates the drive shaft 35, in the above described manner.

Having thus described my invention, I claim:

1. A marine waves power plant having the combination of a first vessel carrying a drive shaft, a second vessel hinged to said first vessel and carrying a mast, a drum having a gear being rotatably mounted on said first vessel, a ratchet rotatably mounted at the end of said drum, a spring-pressed pawl slidable on said drum toward and away from said ratchet, a link connecting said mast with said ratchet, said mast actuating said link by the relative heaving of said vessels to oscillate said ratchet for actuating said pawl to rotate said drum, and means to transmit the rotation of said gear to said shaft.

2. A marine waves power plant having the combination of a first vessel carrying a drive shaft, a second vessel hinged to said first first vessel and carrying a mast, a drum having a gear being rotatably mounted on said first vessel, a rotatably mounted ratchet at each end of said drum, a spring-pressed pawl for each of said ratchets being slidable on said drum toward and away from the ratchet, a link for each of said ratchets connecting it with said mast, said mast actuating said links by the relative heaving of said first vessel to oscillate said ratchets for actuating said pawls to rotate said drum, and means to transmit the rotation of said gear to said shaft.

3. A marine waves power plant having the combination of a vessel hinged to heave by the action of the waves carrying a mast, a drive shaft, a rotatably mounted drum carrying a gear, a rotatably mounted ratchet at the end of said drum, a spring-pressed pawl slidable on said drum toward and away from said ratchet, a link connecting said mast with said ratchet, said mast actuating said link by the heaving of said vessel to oscillate said ratchet for actuating said pawl to rotate said drum, and means to transmit the rotation of said gear to said shaft.

4. A marine waves power plant having the combination of a vessel hinged to heave by the action of the waves carrying a mast, a drive shaft, a rotatably mounted drum carrying a gear, a rotatably mounted ratchet at each end of said drum, a spring-pressed pawl for each of said ratchets being slidable on said drum toward and away from the ratchet, a link for each of said ratchets connecting it with said mast, said mast actuating said links by the heaving of said vessel to oscillate said ratchets for actuating said pawls to rotate said drum, and means to transmit the rotation of said gear to said shaft.

5. A marine waves power plant having the combination of a first vessel carrying a drive shaft, a second vessel hinged to said first vessel carrying a mast, means to drive said shaft through the swaying of said mast resulting from the heaving of said vessels, and said second vessel including a water containing tank for accelerating the heaving and continuity of the heaving of said second vessel.

6. A marine waves power plant having the combination of a first vessel carrying a drive shaft, a second vessel hinged to said first vessel carrying a mast, means to drive said shaft through the swaying of said mast resulting from the heaving of said vessels, and one of said vessels including a water containing tank for accelerating the heaving and continuity of heaving of said second vessel.

7. A marine waves power plant having the combination of a vessel hinged to heave by the action of the waves carrying a mast, a drive shaft, means to drive said shaft through the swaying of said mast resulting from the heaving of said vessel, and said vessel including a water containing tank for accelerating the heaving and continuity of heaving of said vessel.

8. A marine waves power plant having the combination of a first vessel carrying a drive shaft, a second vessel hinged to said first vessel and carrying a mast, a drum having a gear being rotatably mounted on said first vessel, a ratchet rotatably mounted at the end of said drum, a spring-pressed pawl slidable on said drum toward and away from said ratchet, a link connecting said mast with said ratchet, said mast actuating said link by the relative heaving of said vessels to oscillate said ratchet for actuating said pawl to rotate said drum, means to transmit the rotation of said gear to said shaft, and said second vessel including a water containing tank for accelerating the heaving and continuity of heaving of said second vessel.

9. A marine waves power plant having the combination of a first vessel carrying a drive shaft, a second vessel hinged to said first vessel and carrying a mast, a drum having a gear being rotatably mounted on said first vessel, means to rotate said drum through the swaying of said mast resulting from the relative heaving of said vessels, means to transmit the rotation of said gear to said shaft, and one of said vessels including a water containing tank for accelerating the heaving and continuity of heavying of the vessel.

10. A marine waves power plant having the combination of a first vessel carrying a drive shaft, a second vessel hinged to said first vessel and carrying a mast, a drum having a gear being rotatably mounted on said first vessel, a ratchet rotatably mounted at the end of said drum, a spring-pressed pawl slidable on said drum toward and away from said ratchet, a link connecting said mast with said ratchet, said mast actuating said link by the relative heaving of said vessels to oscillate said ratchet for actuating said pawl to rotate said drum, means to transmit the rotation of said gear to said shaft, and said mast being adapted to overhang the hull of said first vessel beyond its bow.

11. A marine waves power plant having the combination of a first vessel carrying a drive shaft, a second vessel hinged to said first vessel and carrying a mast, a drum having a gear being rotatably mounted on said first vessel, means to rotate said drum through the swaying of the mast resulting from the relative heaving of the vessels, means to transmit the rotation of said gear to said shaft, and said mast being adapted to overhang the hull of said first vessel beyond its bow.

HERMAN KAPOLKIN.